Jan. 31, 1956
W. A. DERR ET AL
2,733,399
CIRCUIT BREAKER CONTROL SYSTEM
Filed Jan. 10, 1952
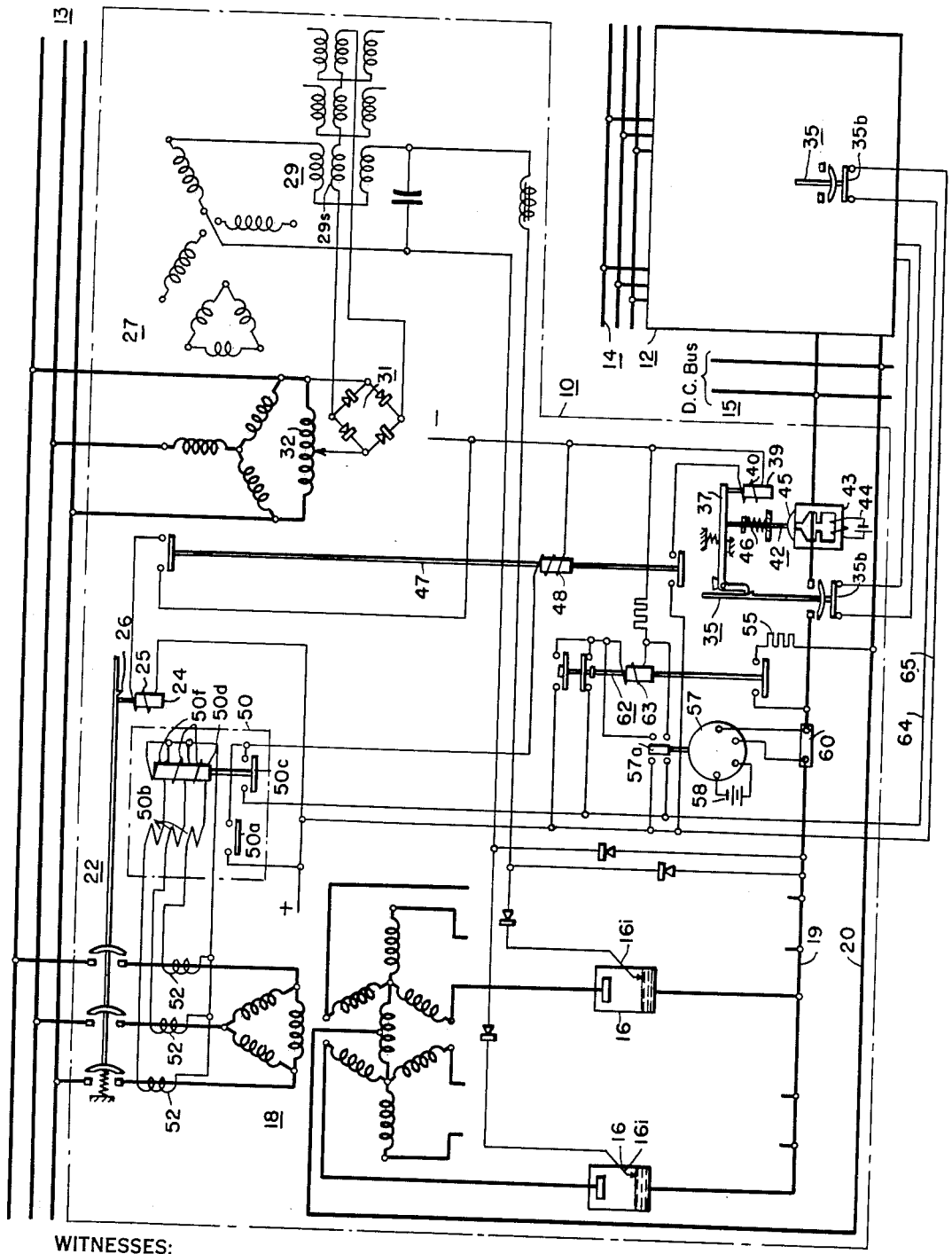
WITNESSES:
C. A. McCloskey.
F. V. Giolma
INVENTORS
Willard A. Derr and
Edward J. Cham.
BY
Ralph H. Swingle
ATTORNEY

United States Patent Office 2,733,399
Patented Jan. 31, 1956

2,733,399
CIRCUIT BREAKER CONTROL SYSTEM

Willard A. Derr, Pittsburgh, and Edward J. Cham, Irwin, Pa., assignors to Westinghouse Electric Corporation, East Pittsburgh, Pa., a corporation of Pennsylvania Application January 10, 1952, Serial No. 265,805

9 Claims. (Cl. 321—12)

Our invention relates generally to circuit breaker systems, and has reference in particular to such systems as are adapted to be used with mercury arc rectifier installations.

Where more than one rectifier unit is used in a substation, it is essential in the interests of service continuity that an arc-back occurring on one unit does not take the other unit or units out of service. High-speed clearing of arc-backs is also essential so as to prevent damage to the rectifier units. While these two requirements may be readily met when anode circuit breakers are used, it is not always feasible to use anode circuit breakers, and in many instances, high-speed clearing of faults has been provided solely by using instantaneous trip elements to take the rectifier units out of service. Since it is not possible to set such elements to provide selectivity when as few as two units may be operated in parallel, unnecessary service interruptions often result.

It is therefore one object of our invention to provide in a new and novel manner for immediately disconnecting from a bus supplied by a plurality of rectifier units, only the faulty rectifier unit, in the event of an arc-back.

Another object of our invention is to provide in a rectifier control system for selectively disconnecting a rectifier unit from both the direct current bus and the alternating current source in the event of an arc-back, without requiring the use of anode circuit breakers.

Yet another object of our invention is to provide in a rectifier control circuit for using both instantaneous trip means and light load control means for selectively disconnecting only one rectifier unit of a plurality from the alternating current source and the direct current bus, in the event of an arc-back on said one unit.

Other objects will in part be obvious, and will in part be explained hereinafter.

In accordance with one embodiment of our invention, the instantaneous trip device in the input circuit of each of a plurality of rectifier units feeding a common bus, is connected to set up an operating circuit for a trip relay which trips both the alternating current input circuit breaker and the direct current output circuit breaker of its own unit. The completion of this operating circuit is effected by using the light load relay in the output circuit of each unit to complete the operating circuit, only in the event that the output current of the particular unit falls below a predetermined minimum light load value. Auxiliary contacts of the other output circuit breakers provide a parallel circuit with the contacts of the light load relay when said other circuit breakers are open, so as to provide for instantaneous tripping of the unit when only the one unit is operating.

For a more complete understanding of the nature and scope of our invention, reference may be made to the following detailed description which may be read in connection with the accompanying drawing in which the single figure is a diagrammatical view of a rectifier control system embodying the invention in one of its forms.

Referring to the drawing, it will be seen that a plurality of rectifier units represented by the two units 10 and 12 may be connected to either a common alternating current bus, or to separate alternating current buses 13 and 14 for supplying electrical energy to a common direct current bus 15. Since the several units may be substantially identical, only the unit 10 has been shown in detail, and it will be realized that the unit 12 and other such units as may be connected therewith, are substantially identical in all respects.

The rectifier unit 10 may comprise a plurality of separate rectifier devices 16 (only two of which are shown) which may be connected in circuit relation with the several phases of a delta 6-phase double-Y rectifier transformer 18 for supplying a direct current output circuit comprising positive and negative conductors 19 and 20, which connects to the direct current bus 15. The primary windings of the rectifier transformer may be connected to the conductors of alternating current source 13 by means of a circuit breaker 22 of any suitable type. The circuit breaker 22, which is herein shown schematically for the purpose of simplification, may be provided with any suitable type of closing means, and is herein shown as being provided with trip means comprising an armature 24 disposed to be actuated by an operating winding 25 to release a latch member 26 and open the circuit breaker.

Excitation of the several rectifier devices 16 may be provided by means of an excitation transformer 27, which may be energized from the conductors of the alternating current source 13 and connected through saturable reactor control means 29 to the ignitors 16i of the rectifier devices. For the purposes of simplification, only phases three and six are shown connected. The ignitors of the rectifier devices of the other phases may be connected in a manner well known in the art. Phase control of the rectifier devices may be effected by connecting the saturating windings 29s of the several control transformers 29 to an adjustable source of control voltage. For example, they may be connected to a rectifier bridge circuit 31 disposed to be energized from a variable voltage auto-transformer 32.

Connection of the rectifier unit 10 to the direct current bus 15 may be effected by means of a direct current circuit breaker 35, which may be of any suitable type, being shown for purposes of illustration as being equipped with a releasable latch 37 for opening the breaker. Trip means 39 having an operating winding 40 may be provided for actuating the latch 37. Reverse current trip means 42 may also be provided for actuating the latch 37. The reverse current trip means 42 may comprise a core 43 of magnetic material surrounding the positive conductor 19 and provided with a polarizing winding 44 for normally retaining a trip armature 45 in a retracted position against the core compressing a spring 46. A reversal of current in the conductor 19 neutralizes the effect of the polarizing winding and permits the armature 45 to actuate the latch 37 to open the circuit breaker.

Control of the circuit breaker 22 may be effected by using a master trip relay 47 to effect energization of the operating winding 25 of its trip means. This master trip relay may also be disposed to effect energization of the trip winding 40 of the direct current circuit breaker 35.

Current responsive trip means 50 may be provided for controlling the operation of the circuit breaker 22. The trip means may comprise a time delay trip element represented by the contact member 50a having operating windings 50b disposed to be energized from current transformers 52 associated with each of the phases of the input circuit to the rectifier unit. This time relay element 50a may be disposed to provide an energizing circuit for the operating winding 48 of the master trip relay 47, so as to trip the circuit breaker, for example, after about 30 cycles duration of an overload on the order of about 200 per cent. The trip means 50 may also comprise an instantaneous trip element represented by the contact member 50c, which may be actuated by an armature 50d having operating windings 50f connected in series circuit relation with the operating windings of the time delay element. The trip element 50c may, for example, be disposed to trip the circuit breaker in one cycle or less for an overload of about 500 per cent.

In order to prevent the voltage of the output circuit conductors 19 and 20 from rising excessively on relatively light loads, an artificial load comprising a resistor 55 may be provided for connection between the conductors 19 and 20. The connection of this resistor 55 may be effected by means of a light load relay 57, which may be polarized, being for example of the D'Arsonval type, having a polarizing winding energized from a direct current source represented by the battery 58, and having an operating winding disposed to be energized from a shunt 60 connected in circuit with the conductor 19. A control relay 62 having an operating winding 63 may be provided for energization in response to movement of the contact member 57a to the left in response to a light load condition for connecting the resistor 55 to the output circuit of the rectifier device 10.

In order to provide for selectively disconnecting the rectifier unit 10 in the event that an arc-back occurs on the unit itself, and not when an arc-back occurs on another one of the several units connected to the direct current bus 15, control of the master trip relay 47 may be effected only in response to operation of both the instantaneous trip element 50c and the light load relay 57. For example, the operating winding 48 of the master trip relay may be connected to a source of control potential through the contact member 50c of the instantaneous trip element and through contact member 57a of the light load relay 57 when it is in the light load position. In order to provide for instantaneous tripping of the rectifier unit 10 in the event that all of the other rectifier units are disconnected from the direct-current bus, a shunt tripping circuit may be provided about the contact member 57a of the light load relay 57, by means of conductors 64 and 65 which may be connected by means of a series circuit arrangement of auxiliary contact members of the direct current circuit breakers 35 of the other several rectifier units which may, in this instance, be represented by the contact member 35b of the direct current circuit breaker 35 of the rectifier unit 12. The circuit breaker 35 of the rectifier unit 10 may be provided with a corresponding auxiliary contact member 35b disposed to be connected in shunt circuit relation with the contacts of the light load relay of the rectifier unit 12. Where more than two rectifier units are to be paralleled, each circuit breaker will require $n-1$ such auxiliary contact members, when $n$ is the number of rectifier units.

When the rectifier units 10 and 12 are in normal operation, the circuit breakers 22 and 35 will be closed, and the contact member 57a of the light load relay 57 will normally be actuated in a clockwise direction so as to provide a shunt around the operating winding 63 of the auxiliary control relay 62 to insure its being maintained in the deenergized position as shown.

Should an overload occur on the rectifier unit 10, for example, the instantaneous trip element 50c may be actuated to set up an energizing circuit for the operating winding 48 of the master trip relay 47. However, since the current flow in the output circuit of the rectifier device 10 is still in the same direction, the light load relay 57 will remain operated in the clockwise direction. Since the circuit between the conductors 64 and 65 is interrupted at contact 35b of circuit breaker 35 of the rectifier unit 12, operation of the instantaneous trip element 50c cannot trip the circuit breakers 22 and 35. Should the fault continue, operation of the time delay contact element 50a provides an obvious energizing circuit for the operating winding 48 of the master trip relay 47. Operation of the master trip relay effects energization of the trip windings 25 and 40, thus opening both the alternate-trip windings 25 and 40, thus opening both the alternating current and the direct current circuit breakers to disconnect the rectifier device 10. Thus, should an arc-back occur on one of the other units, for example, the rectifier unit 12, instantaneous tripping of the rectifier unit 10 is prevented, and tripping of this unit will only result in the event that the overcurrent remains flowing for a sufficient length of time to operate the time delay trip element 50a which will not normally be the case in the event of an arc-back, since this will be removed by operation of the circuit breakers of the faulted unit.

Should an arc-back occur, for example on the rectifier unit 10 while it is in operation, the instantaneous trip element 50c will immediately be operated. Since an arc-back on the rectifier unit 10 results in a reverse flow of current from the direct current bus 15 to the rectifier unit 10, the light load relay 57 will be quickly actuated in a counterclockwise direction. The operating circuit for the master trip relay 47, which was set up by the closing of contact member 50c, is thereupon completed through contact member 57a. The master trip relay 47 is thereupon operated and provides energizing circuits for the trip windings 25 and 40 to quickly open both of the circuit breakers 22 and 35, thus disconnecting the rectifier unit 10 from both the direct current bus and the alternating current source.

From the above description and the accompanying drawing, it will be apparent that we have provided in a simple and effective manner for selectively tripping only the faulted rectifier unit in the event of an arc-back. The other rectifier units connected to the common direct current bus are effectively prevented from tripping instantaneously, and will therefore continue in service when the momentary current due to the arc-back is removed by disconnecting the faulted unit. A rectifier control circuit embodying the features of our invention greatly improves the continuity of service where two or more rectifier units are operated in parallel, and provides increased protection at little or no extra cost.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. In a control system for a rectifier unit, circuit interrupting means for connecting the rectifier unit to an alternating current source, additional circuit interrupting means for connecting the rectifier unit to a direct current circuit, instantaneous trip means responsive to an overcurrent input condition to the rectifier unit, current responsive means connected between the rectifier unit and the direct current bus, and trip means so connected as to be responsive only to substantially simultaneous operation of the instantaneous trip means and a predetermined response of said current responsive means to effect opening of both circuit interrupting means.

2. A control system for a rectifier device having input and output circuits comprising, circuit interrupting means for connecting the input circuit to an alternating current source, additional circuit interrupting means for connecting the output circuit to a direct current circuit, instantaneous trip means responsive to an overcurrent in the input circuit, current responsive means operable in response to a predetermined reduction of current in the output circuit, and means responsive only to operation of both the instantaneous trip means and the current responsive means for effecting operation of both circuit interrupting means.

3. In combination, a rectifier device having input and output circuits, a circuit breaker for connecting the input circuit to an alternating current source, an additional circuit breaker for connecting the output circuit to a direct current bus to which another direct current source may be connected, instantaneous trip means operable in response to an overcurrent in the input circuit, current responsive means operable in response to a predetermined reduction of the current in the output circuit and a reversal thereof, and control means operable only in response to substantially simultaneous operation of the overcurrent and current responsive means upon a reversal of the direct current to effect opening of both circuit breakers.

4. The combination with a rectifier device having an input circuit and an output circuit, of a circuit breaker for connecting the input circuit to an alternating current source, instantaneous trip means operable in response to an overcurrent in the input circuit, an additional circuit breaker for connecting the output circuit to a direct current bus, relay means normally operable in response to a light load on the output circuit to connect an artificial load to the output circuit, and relay means operable only in response to operation of both the instantaneous trip means and the relay means to trip both of the circuit breakers.

5. In combination, a rectifier device having an input circuit and an output circuit, a circuit breaker for connecting the input circuit to an alternating current source, an additional circuit breaker for connecting the output circuit to a direct current bus, directional relay means operable in response to a load of less than one percent of normal to connect a resistance load to the output circuit, instantaneous trip means operable in response to an overcurrent in the input circuit, and an arc-back relay operable only in response to operation of both the relay means as a result of a reverse current and the instantaneous trip means to effect tripping of both circuit breakers.

6. In combination, a plurality of rectifier units each having input and output circuits, a circuit breaker for each unit for connecting its input circuit to an alternating current source, an additional circuit breaker for each unit for connecting its output circuit to a common direct current bus, instantaneous trip means for each unit operable in response to a predetermined value of overcurrent in the input circuit of its unit, directional current responsive means for each unit operable in response to a relatively light load in the output circuit of said unit, a tripping relay for each unit for tripping both circuit breakers of said unit, and circuit means for effecting operation of each tripping relay only in response to substantially simultaneous operation of the instantaneous trip means and the current responsive means of its unit.

7. The combination of a plurality of rectifier units each having an input circuit and an output circuit, a circuit breaker for each unit for connecting its input circuit to an alternating current source, an additional circuit breaker for each unit for connecting its output circuit to a common direct current bus, a trip relay operable to effect tripping of both circuit breakers, instantaneous trip means operable in response to a current in the input circuit of its rectifier unit above a predetermined value to set up an operating circuit for the trip relay of said rectifier unit, current responsive means in the output circuit of said rectifier unit operable to complete said operating circuit only when the current in the output circuit drops below a predetermined minimum value, and circuit means for completing the operating circuit independently of said current responsive means when all of the other rectifier units are disconnected from the direct current bus.

8. In combination, a plurality of rectifier units each having an input circuit and an output circuit, a circuit breaker for connecting the input circuit of each unit to an alternating current source, an additional circuit breaker for connecting the output circuit of each unit to a common direct current bus, a trip relay operable to effect tripping of the circuit breakers of each unit, an instantaneous trip device for each unit operable in response to greater than a predetermined value of current in the input circuit to set up an operating circuit for the trip relay, resistance means for each unit, current responsive means for each unit connected in the output circuit of said unit for connecting said resistance means to the output circuit of its unit and complete the operating circuit for the trip relay when the instantaneous trip device for said unit has operated, and auxiliary switch means associated with each of the additional circuit breakers, the auxiliary switch means of all the other rectifier units being connected to complete the operating circuit for the trip relay of one rectifier unit when all the other rectifier units are disconnected from the common direct current bus.

9. In a rectifier control system, a pair of rectifier units each having an input circuit and an output circuit, a circuit breaker for connecting each input circuit to an alternating current source, an additional circuit breaker for connecting each output circuit to a common direct current bus, a trip relay for each unit for tripping both circuit breakers of said unit, instantaneous trip means for each unit operable in response to greater than a predetermined value of current in the input circuit of said unit to set up an operating circuit for the trip relay of said unit, resistance means associated with each unit, polarized current responsive means connected in the output circuit of each unit operable in response to a reduction of the current in the output circuit below a predetermined value to connect the resistance means of its unit across the output circuit thereof and to complete the operating circuit set up by the instantaneous trip means of said unit, and auxiliary contact means associated with the additional circuit breaker of each unit connected to complete the operating circuit of the trip relay of the other unit.

References Cited in the file of this patent

UNITED STATES PATENTS

| | | |
|---|---|---|
| 1,722,097 | Kern | July 23, 1929 |
| 2,275,881 | Bany | Mar. 10, 1942 |
| 2,354,158 | Taliaferro | July 18, 1944 |
| 2,510,616 | Bany et al. | June 6, 1950 |
| 2,515,989 | Cox et al. | July 18, 1950 |